United States Patent [19]

Tokunaga

[11] Patent Number: 5,375,043
[45] Date of Patent: Dec. 20, 1994

[54] LIGHTING UNIT

[75] Inventor: Makoto Tokunaga, Tokyo, Japan

[73] Assignee: Inoue Denki Co., Inc., Tokyo, Japan

[21] Appl. No.: 87,640

[22] Filed: Jul. 6, 1993

[30] Foreign Application Priority Data

Jul. 27, 1992 [JP] Japan .................. 4-218815

[51] Int. Cl.$^5$ .................................... F21V 8/00
[52] U.S. Cl. ........................ 362/31; 362/32; 362/231; 362/235; 362/800
[58] Field of Search .......... 362/31, 32, 227, 231, 362/235, 249, 800; 40/448, 442, 452

[56] References Cited

U.S. PATENT DOCUMENTS

| | | |
|---|---|---|
| 4,975,809 | 12/1990 | Ku .............................. 362/31 |
| 5,079,675 | 1/1992 | Nakayama . | 
| 5,124,890 | 6/1992 | Choi et al. ..................... 362/31 |
| 5,136,483 | 8/1992 | Schöniger et al. ............. 362/61 |
| 5,147,129 | 9/1992 | Ku .............................. 362/31 |
| 5,239,450 | 8/1993 | Wall ........................... 362/31 |

FOREIGN PATENT DOCUMENTS 1-252933 10/1989 Japan .

*Primary Examiner*—Richard R. Cole
*Attorney, Agent, or Firm*—Jordan and Hamburg

[57] ABSTRACT

Disclosed is a lighting unit of an indirect type, capable of varying the luminance and color of illumination with respect to a target to be lit thereby ensuring an effective display of the target, and further capable of using itself as a display unit. The lighting unit comprises a light guide plate having one side fashioned into an uneven surface or a reflective surface; a plurality of light emitting diodes for supplying a light to the light guide plate, the light derived from the diodes being dispersed through the light guide plate; and a control section which controls actions including blinking of the light emitting diodes. At least a part of the diodes is intended to emit a light different in color from that of the others so that the color or blinking of illumination can be arbitrarily varied through the control by means of the control section.

12 Claims, 3 Drawing Sheets

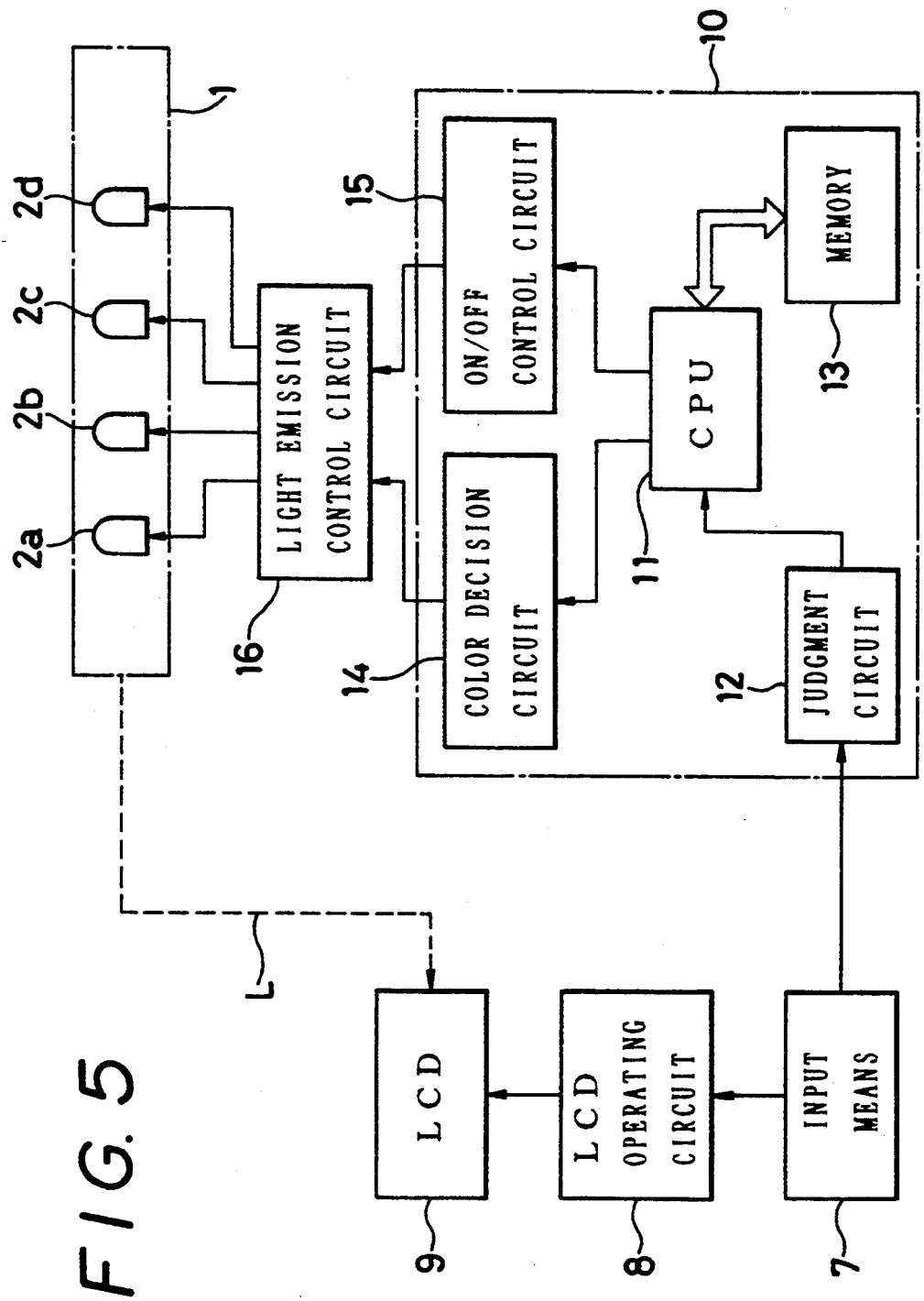

LIGHTING UNIT

BACKGROUND OF THE INVENTION

1. Field of the Invention

The present invention generally relates to a lighting unit, and more particularly to a lighting unit having light emitting diodes as light sources giving off lights to be dispersely reflected to illuminate a target, and also capable of using itself as a display unit.

2. Description of the Related Arts

Up until now, there have been proposed a variety of indirect-type light units which comprise a transparent plate having one side fashioned into an uneven surface or a reflective layer so as to serve as a planar light emitting member, and a plurality of light sources disposed on the side edges of the transparent plate and giving off lights to be scattered by the uneven surface or the reflective layer to substantially uniformly illuminate the entire transparent plate.

Such type of lighting units typically include a relatively large and powerful light sources such as a fluorescent lamp or a tungsten halogen lamp arranged on the side edges of the transparent plate. For example, large-scale ones are used as a device for lighting interior walls, while small-scale ones are utilized as a back light or a device for lighting a liquid crystal display surface on a small-sized computer or a word processor.

Such lighting units that are suitable for relatively uniformly illuminating a relatively large area have a tendency toward technical development to ensure, for example, more uniform overall lighting, enlargement in lighting area, or increased illuminance.

A small-sized device having a display surface such as a pocket calculator, a portable telephone set, or a portable game machine often uses a liquid crystal as its display surface. In this case, the conventional lighting unit is unsuitable to the above products having batteries as their power sources due to its large amount of power consumption. Therefore, most of the products do not employ such lighting unit.

SUMMARY OF THE INVENTION

It is therefore the object of the present invention to provide a lighting unit having a reduced size, and capable of not only functioning as a mere lighting unit but also varying the luminance and color of illumination with respect to a target to be lit thereby ensuring an effective display of the target, and further capable of using itself as a display unit.

According to one aspect of the present invention, in order to accomplish the above object there is provided a lighting unit of an indirect type, comprising a light guide plate comprised of a small-sized uncolored or colored transparent plate having one side fashioned into an uneven surface or a reflective layer; a plurality of light emitting diodes each serving as a light source for supplying a light to the light guide plate, the light derived from the light source being dispersed through the light guide plate; and a control section which controls actions including blinking of the plurality of light emitting diodes; at least a part of the plurality of light emitting diodes being intended to emit a light different in color from that of the others so that the color or blinking of illumination can be arbitrarily varied through the control by means of the control section.

BRIEF DESCRIPTION OF THE DRAWINGS

The object and advantages of the present invention will become more apparent, when viewed in conjunction with the accompanying drawings, in which;

FIG. 5 is a block diagram representing a lighting mechanism of a portable game machine incorporating a lighting unit in accordance with the present invention.

DESCRIPTION OF THE PREFERRED EMBODIMENTS

Figure 1:
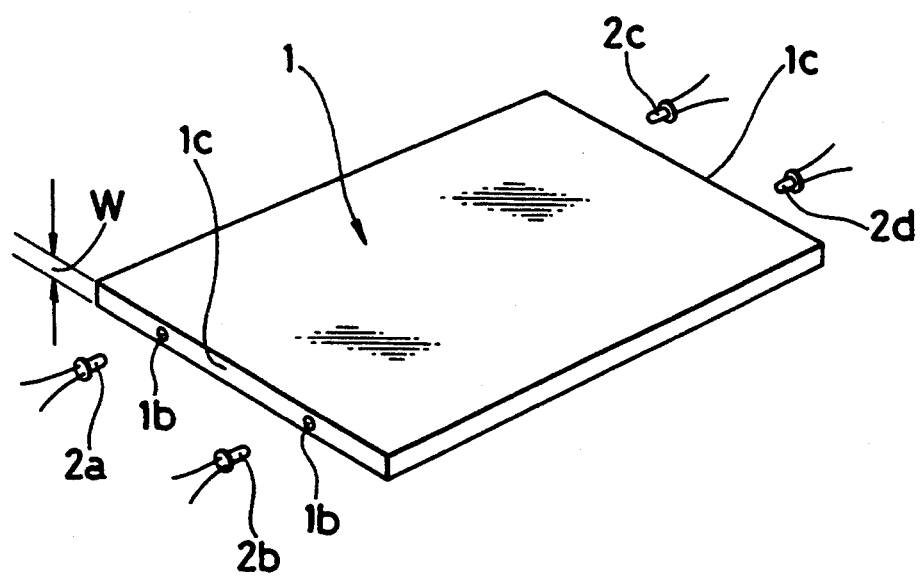
FIG. 1 is a perspective view of a light guide plate showing an embodiment of the present invention.
Figure 2:
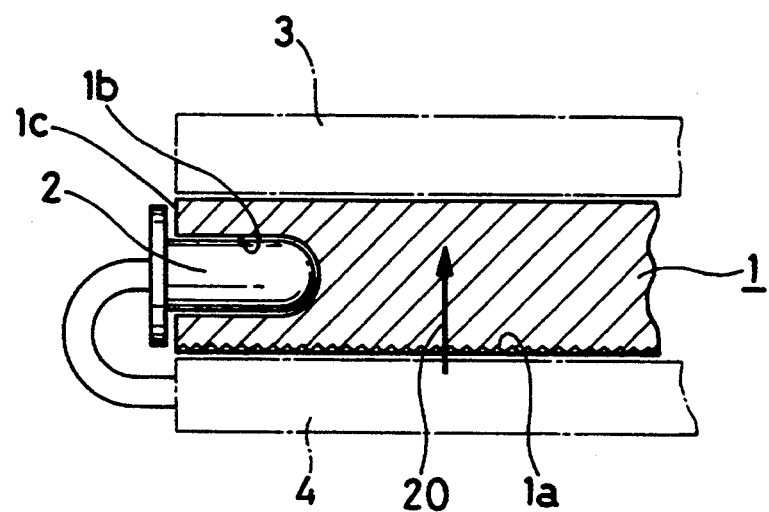
FIG. 2 is a partial sectional view of the light guide plate receiving light emitting diodes.

Referring first to FIGS. 1 and 2, there are shown generally a light guide plate 1 in accordance with the present invention, and partially the light guide plate loaded with light emitting diodes 2 described later, respectively. The light guide plate 1 is essentially a transparent plate made of a transparent material such as acrylic resin or glass. The transparent plate 1 includes at its one side (at its reverse side in FIG. 1) a reflective surface 1a (refer to FIG. 2) having thereon a multiplicity of grooves in series or a multiplicity of minute recesses in a dispersed manner. It is to be appreciated that the reflective surface 1a may comprise a reflective layer formed by printing or other method, instead of such uneven surface. Also, the transparent plate making up the light guide plate is not exactly limited to uncolored one, and any particular color having light transmission properties may be imparted to the plate.

The light guide plate 1 is shown having relatively compact dimensions, for example, of several cm in length and width with several mm in thickness W, suitable for use as a backlight for a liquid crystal display (LCD) panel on a portable electronic device. The light guide plate 1 includes a pair of confronting side edges 1c each having a couple of small holes 1b intended to receive light emitting diodes 2a to 2d (hereinafter referred to as LED's), respectively, serving as light sources.

It is to be noted that at least a part of the LED's 2a to 2d to be loaded into the light guide plate 1 must emit a light different in color from that of the remainder. For example, the LED's 2a and 2d may emit a light in red, while the LED's 2b and 2c may emit a light in green. Alternatively, all of the four LED's may send out different colors.

Presently, there have been a variety of LED's on the market. For instance, the LED composed of gallium arsenide (GaAs) or gallium aluminum arsenide (GaAlAs) emits a red light, the one composed of gallium phosphide (GaP) emits a red or green light, the one composed of gallium arsenide phosphide (GaAsP) emits a red, yellow or orange light, and the one composed of gallium nitride (GaN) or silicon carbide (SiC) emits a blue light. Therefore, prior to mounting onto the light guide plate, the LED's 2a to 2d can be appropriately selected in view of the color at the time of emission of light.

FIG. 2 exemplarily illustrates a state where the LED's are loaded into the light guide plate 1. A liquid crystal display panel designated at reference numeral 3 is disposed on top of the light guide plate 1 so as to allow the content of the liquid crystal display to be irradiated with a light sent forth from the light guide plate 1. Under the light guide plate 1 there is placed an electronic substrate (or printed wiring board) 4 for operating the liquid crystal display panel. The LED's 2a to 2d are electrically connected to the substrate 4 so that they can be turned on or off in response to the operation of the liquid crystal. Naturally, the arrangement of the LED's is not limited to the one shown in FIG. 1, and they may be arranged on the other side edges of the light guide plate 1.

Figure 3:
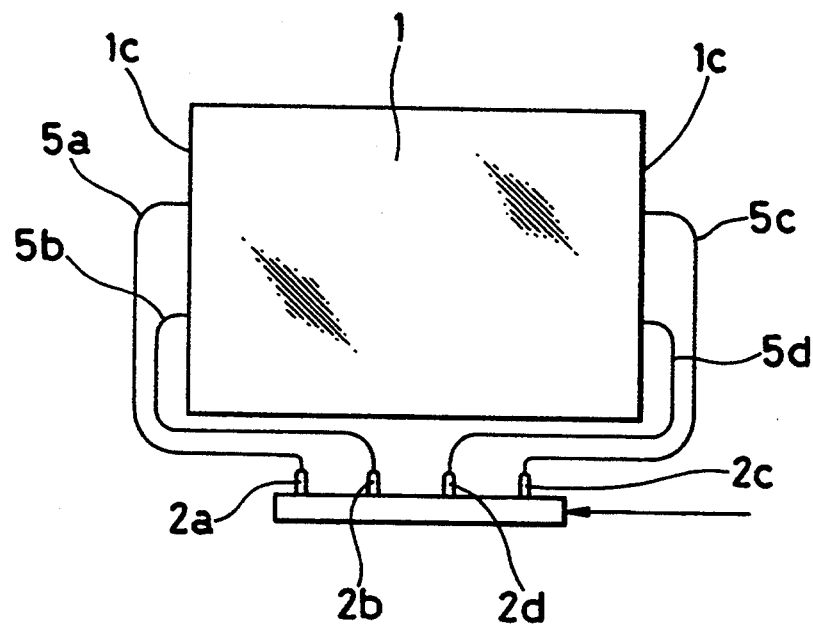
FIG. 3 is a top plan view of the light guide plate showing another embodiment of the present invention.
Figure 4:
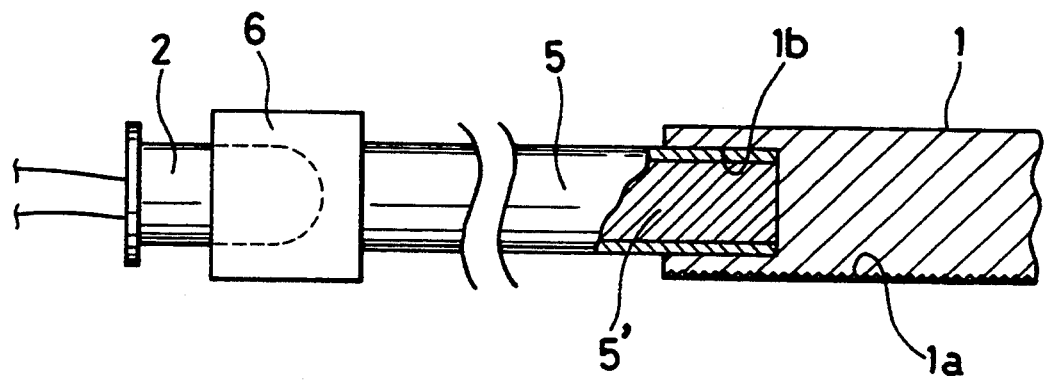
FIG. 4 is a partial sectional view showing the connection of optical fibers.

Referring next to FIGS. 3 and 4, there is shown a second embodiment of the present invention, in which the LED's 2a to 2d serving as light sources are indirectly associated with a pair of confronting side edges of the light guide plate 1 by way of optical transmission media, differently from the above embodiment having the LED's directly fitted to the side edges of the light guide plate 1. The optical transmission media comprises optical fibers 5a to 5d whose one ends are fitted into the small holes 1b provided in the pair of confronting side edges 1c in the same manner as shown in the first embodiment (refer to FIG. 4). On the contrary, the LED's 2a to 2d are positioned apart from the light guide plate 1, and connected to the other ends of the optical fibers 5a to 5d, respectively. Although the LED's 2a to 2d serving as the light sources are arranged in the vicinity of and in the same plane as the light guide plate 1 in FIG. 3, they may be arbitrarily positioned, for example, under the light guide plate 1. It is also conceivable to use, for example, several tens of LED's or for a large-sized light guide plate a multiplicity of, that is, several hundreds of LED's. In this case, the use of the optical fibers increases the freedom in designing an apparatus incorporating the present lighting unit, for example, by disposing the multiplicity of LED's and a control for the LED's separately from the light guide plate.

FIG. 4 exemplarily shows connections of an optical fiber 5, which has one end fitted into the small hole 1b provided in the side wall of the light guide plate 1 and the other end linked with the LED 2 through a connector 6. This connection ensures that the light guide plate receives a light emitted from the LED 2 by way of a core 5' of the optical fiber 5 and gives off light.

Although the LED's serving as light sources are all associated with the side edges of the light guide plate directly or indirectly via the optical fibers 5 in the above embodiments, the LED's or at least a part of the other ends of the optical fibers connected with the LED's may be arranged at predetermined positions on the light guide plate 1 in the direction of its thickness (as indicated by an arrow 20 in FIG. 2).

Referring finally to FIG. 5, there is shown a block diagram of a configuration, by way of example, in which the lighting unit described above is utilized as a device for illuminating the liquid crystal display (LCD) on a portable electronic game machine such as "GAME BOY" (trade mark).

The game machine comprises an input means 7 including keys and button switches; an LCD operation circuit 8 for operating liquid crystal display based on data supplied through the input means 7; and a liquid crystal display (LCD) 9 to be operated in accordance with image signals output from the LCD operation circuit 8. This lighting unit is incorporated into the game machine so as to illuminate the liquid crystal display 9.

Denoted by reference numeral 10 is a means of controlling the illumination of the lighting unit, more specifically, a means of controlling the action of the LED's serving as light sources of the lighting unit, which includes a central processing unit (CPU) 11, a judgment circuit 12, a memory 13, a color decision circuit 14, and an on/off control circuit 15. The LED's 2a to 2d are connected to the control means 10 by way of a light emission control circuit 16.

The content of the game appears on the liquid crystal display 9 in response to an input operation performed through the input means 7 by the game machine operator in compliance with a game rule. Then, the judgment circuit 12 in the control means 10 judges whether the input operation conforms to the game rule or whether it is advantageous to the game player. Lighting patterns individually corresponding to the judgment results are previously created and stored within the memory 13.

The central processing unit 11 retrieves a lighting pattern corresponding to a result of judgment from the memory 13, and for the execution of the lighting pattern issues an operation signal to either the color decision circuit 14 or the on/off control circuit 15, or alternatively to both the color decision circuit 14 and the on/off control circuit 15. The color decision circuit 14 and the on-off control circuit 15 are intended to issue a signal acting as a light-on or light-off signal for the LED's to the light emission control circuit 16 so that the LED's 2a to 2d are turned on or off in conformity with the signal. The liquid crystal display 9 is thus illuminated by a light L derived from the lighting unit.

More specifically, let the content of the game to be performed in the game machine be "the operator who has a certain number of points is to recover treasures taken by the enemy". If the number of points possessed by the operator is decreased, then the red LED may be turned on to redden the screen of the liquid crystal display 9, and if the danger is further increased, then the on/off control circuit 15 may be actuated to allow an intermittent flash of red light. On the contrary, if the number of points is increased or the treasures are successfully recovered, the lighting may be greened. Moreover, providing that red, yellow, green, and blue are assigned to the lights the LED's 2a to 2d emit, respectively, a white light can be obtained by simultaneously giving off the red, green, and blue lights since they are so-called three primary colors, thus enabling an ordinary non-colored lighting. In addition, the simultaneous lighting of yellow and red LED's can present a tone of color substantially equal to gold, which is suitable for the display indicating, for instance, that the game was over with a high points.

In the case where the LED's are disposed not only in the side edges of the light guide plate but also in the direction of thickness thereof, a basic lighting for the light guide plate may be allotted to the LED's in the side edges, while the provision of contrast to the screen of the liquid crystal display may be allotted to the LED's extending in the direction of thickness and appropriately blinking, thereby ensuring a wide variety of display.

Although the above description has been made on, by way of example, the application of the present lighting unit to the game machine, it will be obvious to those skilled in the art that the present lighting unit has various other applications to, for example, display surfaces of a speedometer for motor vehicles as well as measuring instruments such as a sound level meter, a bathometer, and a sphygmomanometer. For example, the application to the speedometer would allow the color of a display light for the speedometer to change from blue which has been lit so far to red if the vehicle speed exceeds a legal speed limit. Furthermore, the application to the liquid crystal display indicating a measurement value of the sound level meter would allow the illumination for the liquid crystal display to be green if the measurement value is not more than the preset sound level, and to become red if it is over the preset value.

What is claimed is:

1. A lighting unit of an indirect type for substantially uniform illumination, comprising:
   a light guide plate comprised of a transparent plate;
   a plurality of light emitting diodes each serving as a light source for supplying a light to said light guide plate, said light emitting diodes being arranged to enable selective illumination of different colored light by said lighting unit;
   means for substantially uniformly distributing said light in said light guide plate; and
   a control section connected to energize said plurality of light emitting diodes;
   said control section comprising a liquid crystal display panel operating system adapted to output control signals for a liquid crystal display panel, and means for energizing said light emitting diodes in response to outputs of said liquid crystal display panel operating system, whereby the illumination of said lighting unit varies as a function of said output control signals.

2. The lighting unit of claim 1 wherein said means for substantially uniformly distributing said light comprises a reflective layer covering one surface of said light guide plate.

3. The lighting unit of claim 1 wherein said means for substantially uniformly distributing said light comprises grooves or recesses distributed throughout one surface of said light guide plate.

4. The lighting unit of claim 1 wherein said control section comprises means for energizing said light emitting diodes to provide a blinking illumination from said light guide plate.

5. A lighting unit for illuminating a liquid crystal display device of the type having a liquid crystal display panel and a control circuit connected to control the selective energization of said liquid crystal display panel, the improvement wherein said lighting unit comprises:
   a light guide plate comprised of a transparent plate;
   a plurality of light emitting diodes each serving as a light source and being arranged to supply light to said light guide plate, said light emitting diodes including light emitting diodes of different colors; and
   a control section connected to energize said plurality of light emitting diodes;
   said control section comprising means for selectively energizing said liquid crystal display panel and means for selectively energizing said light emitting diodes to control the color of illumination of said lighting unit in dependence upon said selective energization of said liquid crystal display panel.

6. The lighting unit of claim 5 wherein said lighting unit is positioned adjacent a first side of said liquid crystal display panel.

7. The lighting unit of claim 5 wherein said lighting unit is sandwiched between said liquid crystal display panel and said control section.

8. In a display system of the type having a liquid crystal display panel, a control circuit connected to control the selective energization of said liquid crystal display panel, and a lighting unit for supplying light to said liquid crystal display panel, the improvement wherein said lighting unit comprises:
   a light guide plate comprised of a transparent plate;
   a plurality of light emitting diodes each serving as a light source and being arranged to supply light to said light guide plate, said light emitting diodes including light emitting diodes of different colors; and
   a control section connected to energize said plurality of light emitting diodes;
   said control section comprising means responsive to said control circuit for illuminating said lighting unit with different colors in response to information displayed on said liquid crystal display panel.

9. The display system of claim 8 wherein said liquid crystal display panel has a viewing surface and a rear surface, and said light guide plate is positioned adjacent said rear surface.

10. The display system of claim 8 wherein said light guide plate is sandwiched between said liquid crystal display panel and said control section.

11. The display system of claim 10 comprising a reflective surface on the side of said light guide plate opposite said liquid crystal display panel for substantially uniformly distributing said light.

12. The display system of claim 10 comprising a recessed or grooved surface on the side of said light guide plate opposite said liquid crystal display panel for substantially uniformly distributing said light.

* * * * *